Dec. 15, 1925.
G. BRASSEUR ET AL
1,566,181
SHEET GLASS DRAWING FURNACE
Filed Aug. 15, 1923     3 Sheets-Sheet 1
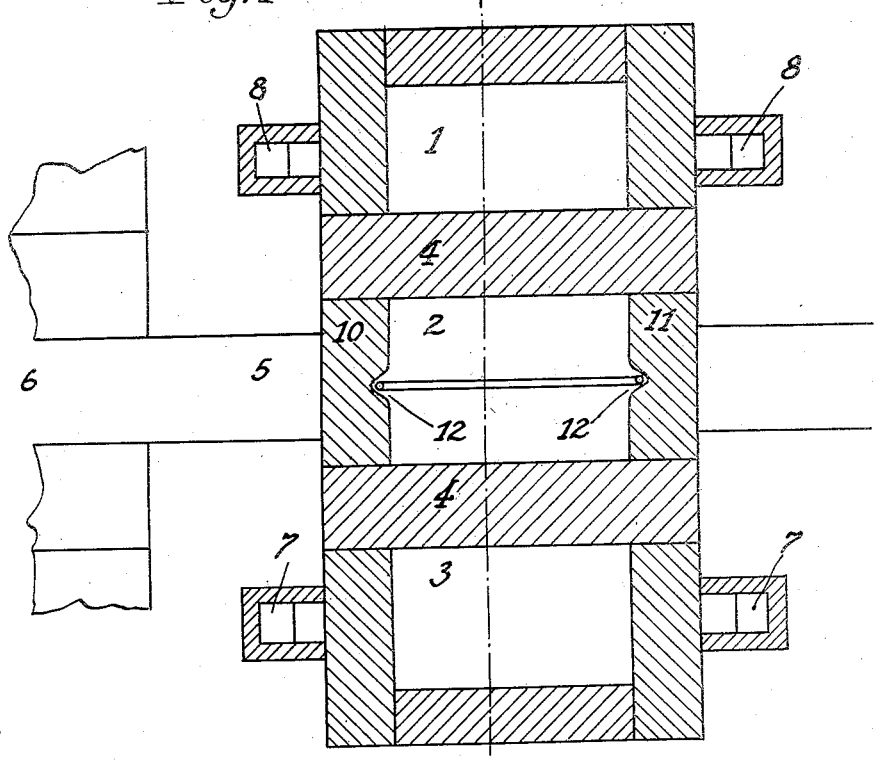
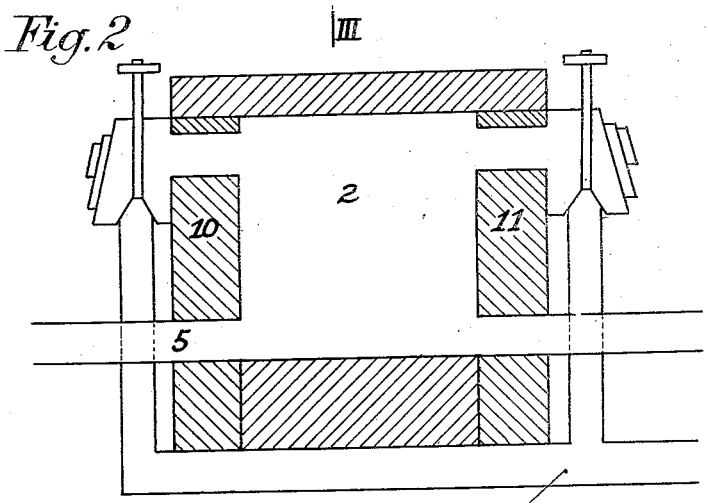
INVENTORS.
GEORGES BRASSEUR
ARISTIDE ANDRIS
ATTORNEY.

Dec. 15, 1925.

G. BRASSEUR ET AL 1,566,181

SHEET GLASS DRAWING FURNACE

Filed Aug. 15, 1923      3 Sheets-Sheet 2

Inventor
Georges Brasseur
Aristide Andris

By *[signature]*   Attorney

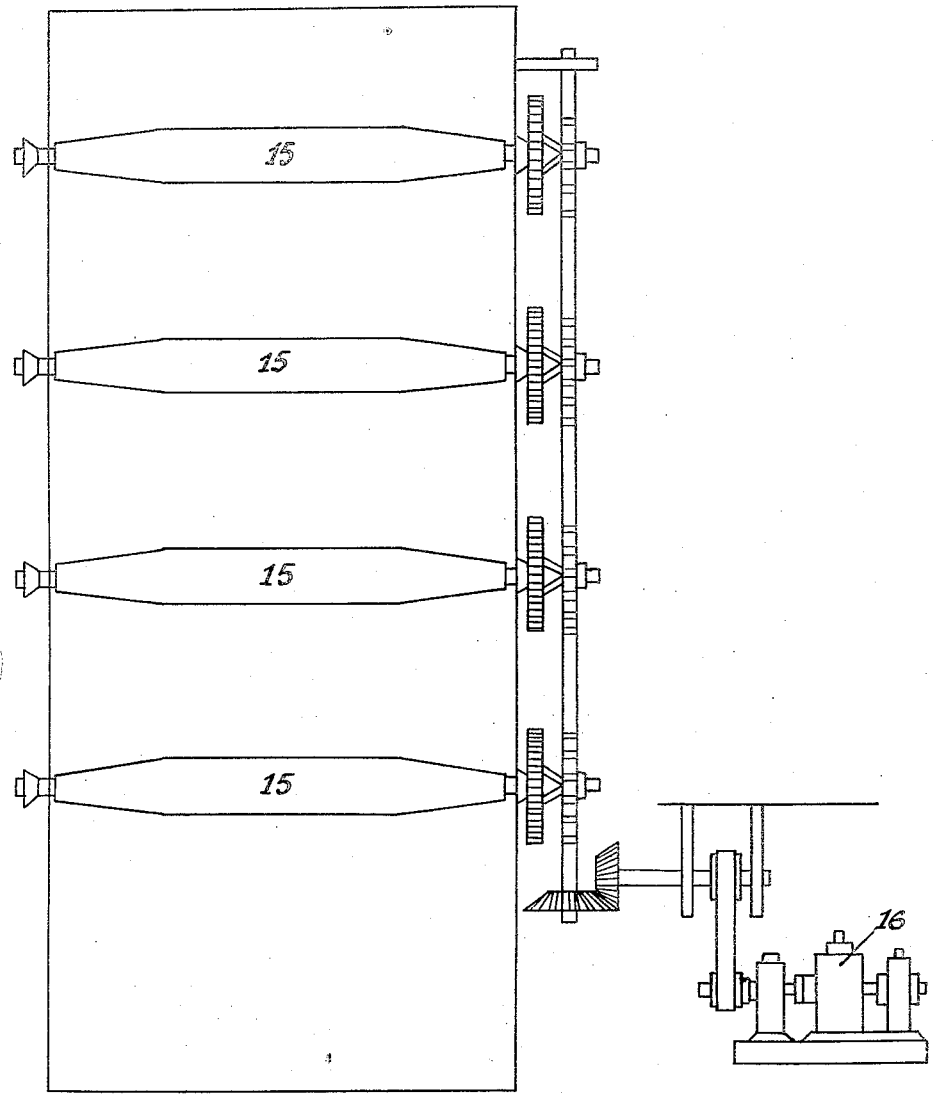

Patented Dec. 15, 1925.

1,566,181

UNITED STATES PATENT OFFICE.

GEORGES BRASSEUR AND ARISTIDE ANDRIS, OF CHARLEROI, BELGIUM.

SHEET-GLASS-DRAWING FURNACE.

Application filed August 15, 1923. Serial No. 657,565.

*To all whom it may concern:*

Be it known that we, GEORGES BRASSEUR and ARISTIDE ANDRIS, subjects of the King of Belgium, and residents of Charleroi, Belgium, have invented certain new and useful Improvements in Sheet-Glass-Drawing Furnaces, of which the following is a specification.

Our present invention has reference to a novel sheet glass drawing furnace or oven comprising three compartments, the central one of which, wherein the molten glass to be drawn is contained, is separated from the two others, serving to heat the molten glass by thick fireproof stones. In this way the molten glass will be held in a regular viscous condition from bottom to top, whereby cords or flutings will be avoided in the finished glass plates.

According to the invention the furnace will not be heated at the bottom or top as usually, but on the entire lateral periphery whereby the viscous condition of the molten glass will be maintained more uniform. Another important feature of the furnace according to the invention resides in the fact that the drawing operation will be considerably simplified and effected by vertical bevelled or V-shaped grooves in the walls of the drawing compartment, a glass drawing or fetching plate dipped into the molten glass bringing the glass into said groove and thus permitting of drawing same continuously in any desired thickness. In order to maintain the glass sheets drawn at the same width, the rims thereof will be cooled by a suitable circulation of cold water which also forms a part of my invention.

In the drawings:

Fig. 1 is a horizontal section of the glass drawing furnace having three compartments.

Fig. 2 is a vertical section of the drawing compartment shown in Fig. 1.

Fig. 6 is a diagrammatical view of the drawing machine.

Figure 3:
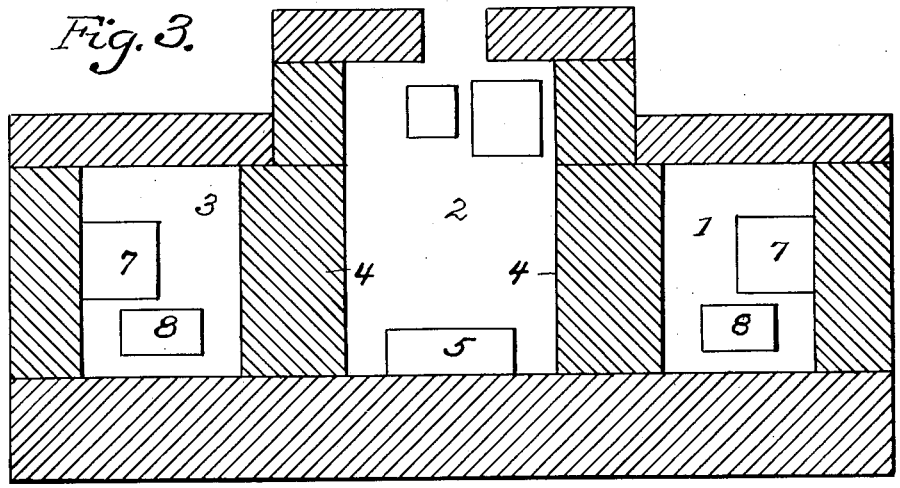
Fig. 3 is a vertical section on line III—III in Fig. 1.
Figure 4:
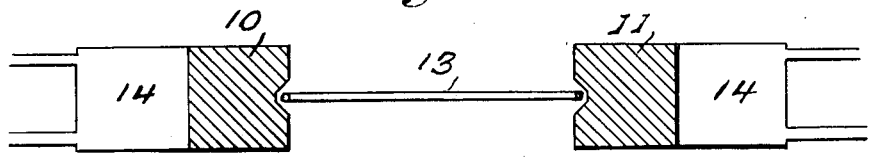
Figs. 4 and 5 show details.

The drawing furnace proper comprises three compartments 1, 2, 3 separated from each other by fireproof stones 4.

The central compartment 2 which receives the molten glass is connected by a lower conduit 5 to the glass melting-oven 6. Thus the melting oven 6 and compartment 2 communicate with each other in the manner of communicating vessels.

The molten glass supplied through the conduit 5 is held in a regular viscous condition from bottom to top by the heating effected by the adjacent compartments 1 and 3, 7 designating air-valves and 8 gas-valves.

The gas supplied by a gas-producer passes through the conduit 9 to the valves 8 and compartments 1 and 3.

Figure 5:
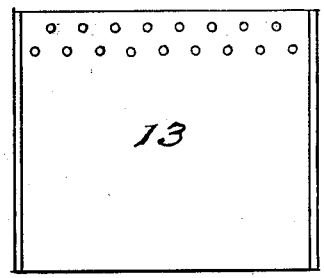

The fireproof walls 10 and 11 of the compartment 2 are provided with vertical V-shaped grooves 12 extending over the entire height thereof. An iron plate 13 (Fig. 5) dipped into the compartment 2 and slidably engaging said grooves 12, serves to fetch the drawing operation. As said plate is raised, the molten glass will rise in said grooves towards the rollers of the drawing machine. The sheet or plate of glass rises continuously and the sheet or plate produced has no cords or flutings.

A water circulation tank 14 is provided to cool the walls 10 and 11 and secure a constant width to the plates, whilst a coil, not shown, is provided to cool the glass plate itself.

The drawing machine proper may be of any desired design. For instance it may be formed of a series of asbestos rollers 15 actuated by an engine 16.

The melting oven 6 is arranged to supply any desired number of units such as 1, 2, 3, for instance two or three on each side and at the front.

Having now fully described our said invention, what we claim and desire to secure by Letters Patent, is:

In a sheet glass drawing furnace, a molten glass compartment, a heating chamber at each of two opposing sides of said compartment, the remaining sides of said compartment being without direct heating, the non-heated sides of the compartment being formed with V-shaped grooves to receive a plate to start the glass drawing from the compartment in sheet form with the edges thereof in contact with the non-heated sides of the compartment.

In testimony whereof we have hereunto set our hands.

GEORGES BRASSEUR.
ARISTIDE ANDRIS.